Sept. 1, 1936.  Y. A. ROCARD  2,052,660

DEVICE FOR STABILIZING RAIL VEHICLES

Filed Feb. 13, 1936

Y. A. Rocard
INVENTOR

By: Glascock Downing Seibold
Attys.

Patented Sept. 1, 1936

2,052,660

UNITED STATES PATENT OFFICE 2,052,660

DEVICE FOR STABILIZING RAIL VEHICLES

Yves André Rocard, Paris, France

Application February 13, 1936, Serial No. 63,806
In France February 11, 1935

6 Claims. (Cl. 105—80)

The present invention relates to a device for the stabilizing of rail vehicles, particularly applicable to locomotives, automotive cars and the like, and particularly adapted for suppressing or damping the oscillating movements consisting of lateral displacements and of horizontal angular oscillations of the chassis of the vehicle.

It is known that a rail vehicle, such as a locomotive, always consists of an assembly of chassis which are practically rigid, at least as far as their lateral displacements are concerned, and which are generally connected to one another by means of articulated devices eventually provided with means for producing yielding resetting forces, as for instance in the case of bogies and bissels connected by means of pivots and springs to the main chassis of a locomotive. Due to the fact that the rolling surface of the vehicle wheels is slightly bevelled, the value of such bevelling being 1/20°, any angular displacement of the axis of such chassis with respect to the track axis produces a difference between the effective radii of both wheels of the same axle and therefore a difference in the paths set back by said wheels. This results in increasing the angular shift between the axes of the chassis and of the track; then the friction forces, the axle torsion and the strains acting in opposite direction on the other axles of the chassis will tend to give the latter an angular displacement in the opposite direction thus resulting in horizontal angular oscillations of the vehicle.

In the case of a single axle, a simple calculation shows that the above effect will produce an undamped sinusoidal oscillation of constant amplitude. In the case of a rigid chassis with a number of axles, the problem becomes, on the contrary, very complicated due to the fact that it is mathematically impossible for the wheels of the various axles to roll on the rails without gliding when the chassis axis is not in line with the track axis. Experience shows, however, that in this case lateral oscillations will again be set up, the amplitude of which may increase under certain conditions until the wheel flanges will strike against the rails, thus producing violent shocks and deformations of the track which may cause very serious accidents. The said phenomenon will be produced especially in the case of heavy high speed locomotives.

The object of the present invention is to remedy these drawbacks. The invention is characterized by the fact that the various chassis on which the vehicle rests, and the connections between these chassis are constituted in such a manner that the forces set up by the elastic deformations of the wheels and rails in the region of their surface of contact will oppose the said lateral oscillations of the vehicle.

For the sake of example, one embodiment of the invention, applied to a steam locomotive, has been described in the following and represented in the annexed drawing.

Figure 1:
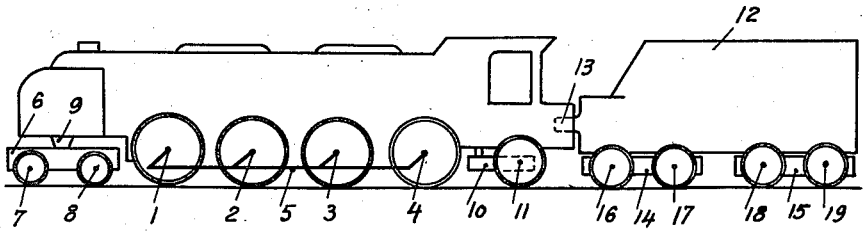
Figure 1 is an elevation of a usual locomotive with its tender.

As has been pointed out above, the rolling of the various axles of a locomotive with bevelled wheels cannot proceed without a certain amount of gliding when the chassis axis is not in line with the track axis. If therefore it is assumed that the wheels and axles are indeformable bodies, a locomotive could, under such conditions, only travel along the track by overcoming considerable friction forces, which does not seem to correspond to actual conditions.

The author has discovered that the movement of a locomotive may, on the contrary, be explained perfectly by considering the local elastic deformations of the wheels and rails in the region of their contact surfaces, and further, that the system of forces produced by said elastic deformations plays a very important part in the law of the oscillating movements of the vehicle. The invention therefore consists in determining in such a manner the various mechanical characteristics of the vehicle that said system of elastic forces will exert on the vehicle a stabilizing effect.

The study of the complete equation of the movement of an isolated rigid chassis, such as the bogie or the main chassis of a locomotive, worked up with due consideration to the elastic deformations, equation which it is not necessary to reproduce here, shows, indeed, that if the chassis is entirely symmetrical with respect to its mass centre, said oscillating movement is unstable at all speeds. If said symmetry be suppressed and if the amount of bevelling of the wheels be $c_n$, whilst $r_n$ is the radius of the wheels, and $s_n$ the distance of the $n^{th}$ axle to the mass centre (this distance being taken as positive for the axles in front of the mass centre, and as negative for the axles beyond said mass centre), it will be found that the oscillating movement may be damped only in the case when the result of the summation of:

$$\left(\frac{s_n \cdot c_n}{r_n}\right)$$

extended to all the axles is positive, the stability increasing when the result of said summation has increasing positive values. The subscript "$n$" in the foregoing formula is merely to show that the formula is applied to successive axles and has no other function in evaluating the formula.

In order to satisfy this condition, the wheels of the axles lying in front of the mass centre, in the case of a rigid chassis with a number of axles, for which $s_n$ is positive, will be given, according to the invention, rolling surfaces with greater bevelling, or a smaller radius, or preferably both these means will be applied together, in order to increase the expression $$\left(\frac{c_n}{r_n}\right)$$

which will be termed the relative bevel of the wheel, whilst the wheels disposed beyond the mass centre, for which $s_n$ is negative will only receive a weak amount of bevel or no bevel at all, or a greater diameter, or preferably both these means, in order to reduce their relative bevel.

Furthermore, when the vehicle comprises several chassis, as is the case in a locomotive having, besides the main chassis with axles coupled by means of the rod connecting the wheels, a front bogie, a bissel and a tender, the wheels of the front chassis are given a greater bevel and a smaller diameter, and those of the back chassis are given a smaller bevel and, preferably, a greater diameter.

Figure 2:
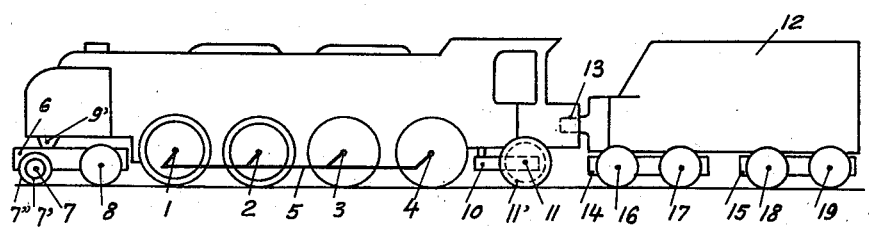
Figure 2 is an elevation of the same locomotive provided with the stabilizing means according to the invention.
Figure 3:
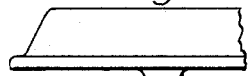
Figures 3, 4 and 5 illustrate respectively the tyres of greater bevel, of less bevel and of zero bevel.
Figure 4:
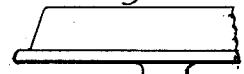
Figure 5:
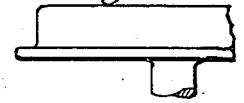

These various means are represented in Figures 1 and 2 of the drawing.

Figure 1 represents a usual locomotive, of type 241, with its tender. This locomotive comprises a motor chassis with four axles 1, 2, 3, 4 coupled by means of a connecting rod 5. At the front end of the engine is a bogie 6 comprising two axles 7 and 8 and pivoted to the motor or main chassis of the locomotive by means of a pivot pin 9 arranged at the same distance from both axles 7 and 8. At its rear, the engine rests on a bissel 10 comprising an axle 11, and it is coupled to a tender 12 pivoted to it in 13 and comprising two bogies 14 and 15 carrying respectively the axles 16, 17 and 18, 19. All the wheels of the various axles have the same standard bevel of 1/20, this having been indicated in the drawing by providing each wheel with a circle representing the extreme edge of the tyre and disposed, for all the wheels, at the same radial distance from the inner circle representing the edge of the wheel.

Figure 2 represents the same locomotive modified according to the invention. The front axle 7 of the bogie 6 is disposed lower and carries smaller wheels with greater bevel, this being represented by the greater radial spacing between the circle 7' representing the edge of the wheel and the circle 7" representing the edge of the tyre (this bevel of the front wheels of the bogie may be for instance $\tfrac{1}{10}$). The rear axle 8 of the bogie carries larger wheels with weak or zero bevel, as represented on the drawing. Furthermore, the pivoting point of the bogie has been shifted to 9', towards the front axle, in a manner that the centre of mean distances of the bogie axles be situated substantially behind the pivoting point, this introducing another element of dissymmetry, which is desirable for the stability of the engine.

The wheels of the front axles 1 and 2 of the main chassis have a great bevel, $\tfrac{1}{10}$ for instance, whilst the bevel of the back axle wheels 3 and 4 has been reduced or even suppressed.

It is also desirable to reduce or suppress the bevel of the bissel bogie 10, except in the cases where it is desirable for the engine to run backwards with comparatively high speeds, in which case it is preferable to give the bissel wheels 11 a slight bevel, represented on the drawing by a circle 11' in dotted lines.

Lastly, the wheels carried by the tender axles 16, 17, 18, 19 have no bevel.

The means heretofore described have the effect of individually stabilizing all the chassis constituting the vehicle. It is further desirable to consider the means for linking the various chassis to one another. Thus, it is known that in the locomotives of the classical types, such as that represented in Figure 1, the pivot 9 of the front bogie 6 may, in order to facilitate the passing of curves, be displaced laterally with respect to the main chassis, and that it is provided with resetting springs which are indispensable for the stability of the bogie, these springs being tensioned even at rest, when the pivot lies in its equilibrium position. These powerful springs present drawbacks owing to their reaction upon the track, particularly in curves, and, on the other hand, stability is no longer ensured at the speeds it is possible to attain, as soon as one of the springs is moved back under the effect of the lateral displacement of the pivot.

In the case where the bogie and the main chassis have been rendered individually stable according to the present invention, the engine will be stable even in the absence of any restoring torque exerted upon the bogie. The restoring springs may therefore easily be determined in such a manner that they do not give rise, in curves, to exaggerated reactions upon the track.

What I claim is:

1. Rail vehicle provided with multi-axle chassis and with wheels with bevelled tyres, comprising means for opposing the oscillating movement of the vehicle, said means consisting in that the locations of said axles and the bevel of the wheels are determined in a manner that the result of the summation, extended to all the axles of a chassis, of the product of the distance of each axle to the mass centre of the chassis, by the bevel of the wheels of this axle, be positive, the distances of the axles from the mass centre being counted positively for the axles situated in front of the mass centre, and negatively for the axles at the rear of said mass centre.

2. Rail vehicle provided with multi-axle chassis mounted on wheels with bevelled tyres of same diameter, in which the wheels of the axles situated in front of the mass centre of the chassis have a greater bevel than the wheels of the axles at the rear of said mass centre.

3. Rail vehicle provided with multi-axle chassis mounted on wheels with bevelled tyres, in which the wheels of the axles situated in front of the mass centre of the chassis have a smaller diameter and a greater bevel than the wheels of the axles at the rear of said mass centre.

4. Rail vehicle provided with multi-axle chassis, comprising on the axles situated in front of the mass centre of the chassis wheels with bevelled tyres, and, on the axles at the rear of said mass centre, wheels with cylindrical tyres.

5. Rail vehicle provided with a bogie consisting of a chassis with two axles, wheels with a small diameter and great bevel on the front axle, wheels with a greater diameter and smaller bevel, on the rear axle, a pivot between said chassis and the vehicle body, located nearer to the front axle than to the rear axle.

6. Locomotive comprising at its front end a bogie consisting of a chassis with two axles, on the front axle wheels with a small diameter and great bevel, on the rear axle wheels with a greater diameter and smaller bevel, between said chassis and the locomotive body a pivot located nearer to the front axle than to the rear axle, a main chassis with four axles provided with wheels of a greater diameter than those of the bogie, the wheels of the two first axles of said main chassis having a great bevel and the wheels of the two last axles having zero bevel, a bissel comprising a single axle provided with wheels with very weak bevel.

YVES ANDRÉ ROCARD.